US 6,560,244 B1

(12) United States Patent
Huber

(10) Patent No.: US 6,560,244 B1
(45) Date of Patent: May 6, 2003

(54) SUBSCRIBER NETWORK TERMINAL OF AN ACCESS LINE NETWORK AND METHOD FOR OPERATING A NETWORK CONNECTING UNIT

(75) Inventor: Manfred Huber, Krailling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,578

(22) PCT Filed: Jan. 22, 1998

(86) PCT No.: PCT/DE98/00198

§ 371 (c)(1),
(2), (4) Date: Aug. 17, 1999

(87) PCT Pub. No.: WO98/36610

PCT Pub. Date: Aug. 20, 1998

(30) Foreign Application Priority Data

Feb. 17, 1997 (DE) .......................................... 197 06 071

(51) Int. Cl.⁷ ..................... H04L 12/16; H04Q 11/00; H04J 3/12; H04M 5/00
(52) U.S. Cl. .................... 370/524; 370/264; 370/463; 370/522; 379/322; 379/399
(58) Field of Search ........................ 370/522, 524, 370/437, 438, 463, 465, 468, 259, 264, 359, 363, 420; 379/399, 322, 229; 709/300, 301, 302

(56) References Cited

U.S. PATENT DOCUMENTS

| | | | | |
|---|---|---|---|---|
| 4,592,047 A | * | 5/1986 | Fundneider | 370/420 |
| 4,999,836 A | * | 3/1991 | Fujiwara | 370/522 |
| 5,229,992 A | * | 7/1993 | Jurkevich et al. | 370/468 |
| 5,305,312 A | * | 4/1994 | Forneck et al. | 370/264 |
| 5,404,491 A | * | 4/1995 | Huzenlaub et al. | 710/69 |
| 5,483,530 A | * | 1/1996 | Davis et al. | 370/465 |
| 5,625,685 A | * | 4/1997 | Allegranza et al. | 379/399 |
| 5,694,398 A | * | 12/1997 | Doll et al. | 370/524 |
| 5,815,505 A | * | 9/1998 | Mills | 370/522 |
| 5,818,819 A | * | 10/1998 | Hallock et al. | 370/259 |
| 5,903,572 A | * | 5/1999 | Wright et al. | 370/524 |
| 6,023,473 A | * | 2/2000 | Reine et al. | 370/463 |

FOREIGN PATENT DOCUMENTS

| EP | 0 659 007 A2 | 6/1995 |
|---|---|---|
| WO | WO 98/7292 | 2/1998 |

OTHER PUBLICATIONS

Modelling of a Multi–Queue Polling System with Arbitrary Server Interrupts for the Idle–Slot–Concatenation Packet Switching Principle in a Hybrid CS/PS Node, Huber, et al. pp. 521–528.
Mehrfachnutzung von Teilnehmeranschlubkabeln, pp. 1–5.

* cited by examiner

Primary Examiner—Huy D. Vu
Assistant Examiner—M. Phan
(74) Attorney, Agent, or Firm—Bell Boyd & Lloyd LLC

(57) ABSTRACT

A subscriber side network termination unit of an access line network and method for operating same having: (a) first interface for the access line network-side transmission and reception of a transmission frame containing data channels: (b) a second interface for the subscriber-side offering of telecommunication payload data channels for telecommunication applications as well as a signaling channels, and (c) a third interface for the subscriber-side offering of data channels for data applications. The signaling channel; of the second interface is employed for the transmission of signaling data for the transmission of payload data via the second interface or the third interface.

8 Claims, 1 Drawing Sheet

SUBSCRIBER NETWORK TERMINAL OF AN ACCESS LINE NETWORK AND METHOD FOR OPERATING A NETWORK CONNECTING UNIT

The present invention is directed to a subscriber-side network termination unit and method of operating some of an access line network having: (a) an interface for the access line network-side transmission and reception of a transmission frame with a plurality of data channels, including a signaling channel,: (b) an interface for the subscriber-side offering of telecommunication payload data channels for telecommunication applications as well as a signaling channel allocated to these telecommunication payload data channels; and: (c) an interface for the subscriber-side offering of data channels for data applications.

DESCRIPTION OF THE PRIOR ART

In the subscriber access area, modern telecommunication networks have digital access line networks available to them that connect one or more local switching centers to subscriber terminal equipment via subscriber line networks and subscriber-side network termination units. Access line networks were originally designed for the transmission of low-frequency information signals such as, for example, in analog telephony or in the employment of narrow band services. The bit rate transmitted at the subscriber side in the access line network is thereby defined, for example for a narrow band ISDN basic access, such that the longest subscriber lines that occur still can be used. Apart from data rates of 16 kbit/s employed for synchronization and echo suppression purposes, the narrow band ISDN basic access, which is also referred to as BA (from the English expression "Basic Access"), has a data rate of 144 kbit/s divided into a control channel referred to as D-channel with 16 kbit/s and into two payload channels of 64 kbit/s each that are referred to as B-channels. As a result of this dimensioning basis, a large part of the bit rate that can be maximally dependably transmitted, i.e. of the maximum band width in the access line network area with shorter subscriber lines, remains unused. The degree of attenuation for symmetrical double leads of copper subscriber lines that limits the range of the digital signal transmission, increases with the line length. It is generally valid that the bit rate to be transmitted over a subscriber line can be all the higher the shorter the length of this subscriber line. Access line networks designed for narrow band services, consequently, are also suitable for the transmission of more broad band services. Methods have thus prevailed in recent years with which the existing copper lines in the access line network can be utilized for the transmission of digital information signals.

Vittorio Ferretti, Guillermo Wichmann, "Mehrfachnutzung von Teilnehmeranschlubkabeln", Telecom Report, 14 (1991), No. 3, pages 150–153 discloses a method for dividing the payload data rate of an ISDN-BA of 144 kbit/s into a control channel referred to as D-channel and, optionally, two payload channels each having 32 kbit/s and a payload channel having 64 kbit/s data rate, preferably provided for data applications, or four payload channels each having a 32 kbit/s data rate. Although the plurality of applications, terminal equipment or subscribers connectable via a line pair and a specific network termination unit is increased, the data rate that is available for an application is reduced compared to an ISDN BA or remains of the same size in the best case.

The connection of data processing equipment such as, for example, a computer or an LAN to an access line network of a communication network usually occurs for small companies or private households via a modem and a switched analog or digital connection, or via an ISDN connection having a maximally obtainable data rate of 128 kbit/s.

The patent application DE 196 25 385 3, which was not yet published as of the priority date of the present application, discloses a method for the transmission of information signals in an access line network via subscriber lines, whereby transmission parameters of the subscriber line are measured and settings are undertaken at the exchange side and at the subscriber side based on the criterion of the measured results. These settings, for example, are the bit rate that can be maximally dependably transmitted and, potentially, the transmission method. As a result thereof, bit rate and transmission method can be adaptively undertaken line-individually dependent on the physical transmission parameters. In addition to a D-channel with a band width of 16 kbit/s, it thus becomes possible to transmit even more payload channels wherein each channel has a band width of 64 kbit/s. The maximum plurality of transmittable payload channels is thereby dependent on the band width of the individual subscriber line configuration, particularly on the length of the subscriber line.

To provide an information transport frame divided into time slots of equal size is known as a method for the subscriber-side information transmission in such access line networks. Such method is known from the article by M. N. Huber and P. J. Kühn, "Modelling of a Multi-Queue Polling System with Arbitrary Server Interrupts for the Idle-Slot Concatenation Packet Switching Principle in a Hybrid CS/PS Node", Proceedings of the 12th International Teletraffic Congress, Torino, 1988. Each of these time slots is occupied either with switching system data (CS data based on the English expression "Circuit Switching") or with packet data (PS data from the English expression "Packet Switching"), whereby all prime slots not occupied with switching system data are combined to form a remaining packet data transport channel (idle slot concatenation). The traffic type with which the remaining packet data transport channel is occupied, for example ATM or LAN/Ethernet, is determined by the connection configuration, particularly by the packet data protocol that can be processed by the protocol evaluation means of the subscriber side.

A patent application by the same assignee that was not published as of the filing date of this application discloses a method for a subscriber-side information transmission in an access line network with the assistance of an information transport frame divided into time slots of equal size, wherein at least some of these time slots are payload channel time slots whereof each is occupied either with switching system data or with packet data and all payload channel time slots not occupied with switching system data are combined to form a remaining packet data transport channel. A protocol discriminator that enables an unambiguous allocation of the data contained in a time slot of the remaining packet data transport channel to a traffic type is inserted into every time slot of the remaining packet data transport channel, so that a protocol evaluation that is specific to a traffic type can be respectively undertaken at the reception side. This enables the utilization of the remaining packet data transport channel, which is also called ISC channel or idle slot concatenation channel, by different traffic types such as, for example, ATM and LAN. As warranted, a length particular inserted per message additionally can be communicated given messages of variable length. For the transmission of variable-length messages, another version of such a method provides that a time slot of the remaining packet data transport channel not be occupied between two messages in the remaining packet data transport channel. A time slot of the information transport frame thereby also can be used for frame control, and one time slot can be employed for ISDN signaling, wherein these time slots provided for the transmission of control information preferably are arranged at permanently defined locations within the information transport frame.

An object of the present invention, therefore is to specify a subscriber-side network termination unit of an access line network that adapts an access line network offering a plurality of payload channels to subscriber applications in order to enable a more flexible utilization of such an access line network for telecommunication applications and data applications. Moreover, a method for operating such a network termination unit also should be specified.

SUMMARY OF THE INVENTION

The present invention defines a subscriber-side network termination unit of an access line network having: (a) a first interface offered by an access line interface control for the access line network-side transmission and reception of a transmission frame containing a plurality of data channels, including a signaling channel; (b) a second interface offered by a telecommunication interface control for the subscriber-side offering of telecommunication payload data channels for telecommunication applications as well as a signaling channel allocated to these telecommunication payload data channels; and (c) a third interface offered by a data interface control for the subscriber-side offering of data channels for data applications.

An inventive method for operating such a subscriber-side network termination unit provides that, before the transmission of payload data via either the second or third interfaces, signaling data respectively allocated to the payload data are transmitted via the signaling channel of the interface offered by the telecommunication interface control.

An inventive subscriber-side network termination unit that enables the implementation of such a method, but also reflects an aspect of the present invention independently of such method, contains a control device for enabling a data transmission via the data interface control after a signaling allocated to this data transmission has occured via the signaling channel of the second interface.

As a result of the inventive method, and in the inventive, subscriber-side network termination unit, the signaling channel of the second interface is employed both as signaling channel for the telecommunication payload data channels of the second interface and as a signaling channel for the payload data channels of the third interface. This enables the simple imaging of the two subscriber-side interfaces onto a single access line network-side interface having only one signaling channel, wherein a signaling channel, namely that of the second interface, is available as needed for each of the subscriber-side interfaces. Since a signaling channel is usually required only for a brief time, namely during the signaling phase, and signaling data are unproblematical in view of delay times, one signaling channel also suffices for two interfaces.

In an embodiment of the method of the present invention, it is provided that the data interface control controls the transmission of signaling data allocated to payload data to be transmitted via the third interface via the signaling channel of the interface offered by the telecommunication interface control before these payload data are transmitted via the third interface. A control of the transmission of the signaling data provided for data of the third interface via the signaling channel of the second interface makes it possible that the data application, for example a computer or a LAN with connected computers, need access the subscriber-side network termination unit only via a single interface, namely the third interface. An alternative embodiment of such a method requires that the data application accesses the subscriber-side network termination unit via the third interface and accesses at least via the signaling channel of the second interface. The access via the second interface can thereby occur, for example, by operating the data application as communication terminal equipment at the second interface.

Another embodiment of the inventive method provides that data transmitted into the telecommunication payload data channels of the second interface at the subscriber side are only transmitted in specific data channels in the access line network-side transmission frame. As a result thereof, a fixed allocation of the payload data channels of the second interface to data channels of the transmission frame of the first interface and, thus, a simple conversion between channels of this subscriber-side interface and channels of the access line network-side interface is enabled. It is thereby preferred that the signaling channel of the second interface also is permanently allocated to either a data channel or a signaling channel of the transmission frame of the first interface.

An advantageous development of this aspect of the present invention provides that data transmitted at the subscriber side in the data channels of the third interface are preferably transmitted in the access line network-side transmission frame in free data channels not provided for the transmission of subscriber-side data transmitted in the telecommunication payload data channels of the second interface. This also enables a fixed allocation of specific data channels of the transmission frame of the first interface to the data channels of the third interface and, thus, a facilitated conversion method between these interfaces.

A consistently fixed allocation of all data channels of the third interface to data channels of the transmission frame of the first interface, however, could potentially greatly limit the band width or, respectively, data rate made available for data applications. A modified embodiment of this aspect of the present invention therefore provides that data transmitted subscriber-side in the data channels of the third interface are also transmitted in the data channels provided for the transmission of subscriber-side data transmitted in the telecommunication payload data channels of the second interface when inadequate data channels provided for the transmission of subscriber-side data transmitted in the telecommunication payload data channels of the second interface are not free in the access line network-side transmission frame for these data. When, given such a development of the present invention, adequate band width is not made available for a data application by data channels of the transmission frame of the first interface permanently allocated to the data channels of the third interface, data channels of the transmission frame of the first interface permanently allocated to the payload data channels of the second interface also are employed for the transmission of payload data of the third interface. A data channel of the transmission frame of the first interface potentially allocated to the signaling channel of the second interface is not employed for the transmission of payload data of the third interface since this signaling channel is also required for the third interface.

I an embodiment of the subscriber-side network termination unit, it is provided that the second interface offers two telecommunication payload data channels for telecommunication applications at the subscriber side. When, in particular, the two telecommunication payload data channels offered by the second interface respectively have a data rate of 64 kbit/s in a development of such an embodiment of a subscriber-side network termination unit and the signaling channel offered by the second interface has a data rate of 16 kbit/s, this interface corresponds to a standardized interface according to narrow band ISDN that is referred to as So interface.

Another embodiment of the subscriber-side network termination unit provides that the first interface offers a transmission frame at the access line network side having a plurality of data channels with a respective data rate of 64 kbit/s. The conversion of the access line network-side data channels into the payload data channels of the subscriber-side, second interface with the same transmission rate thereby can be very simply implemented and is reduced to a purely physical conversion given a fixed channel allocation.

Additional features and advantages of the present invention are described in, and will be apparent from, the Detailed Description of the Preferred Embodiments and the Drawing.

DETAILED DESCRIPTION OF THE PREFERRED EMBODIMENTS

Figure 1:
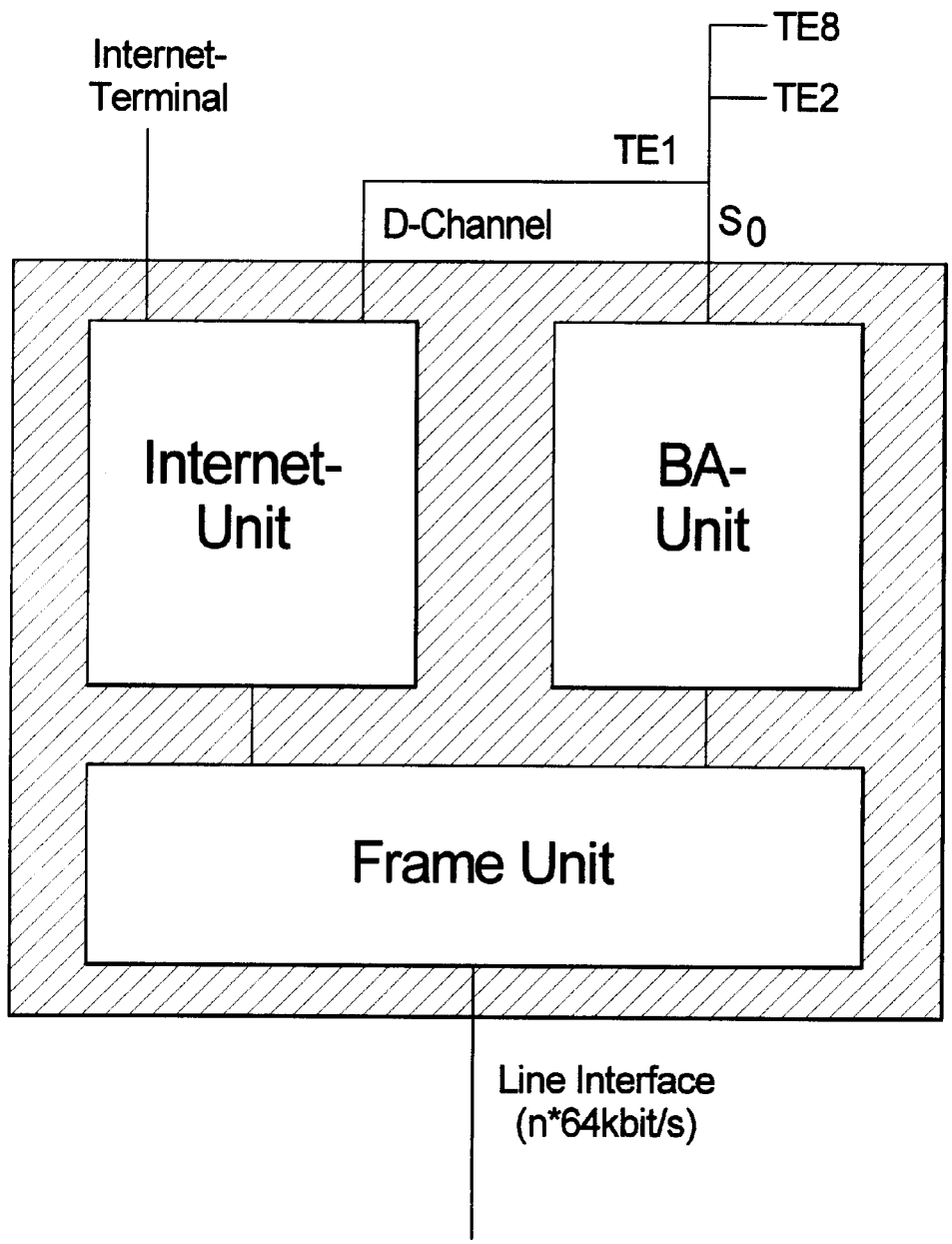
FIG. 1 is a schematic block diagram of the subscriber-side network termination unit in accordance with the present invention.

The exemplary embodiment of the invention subscriber-side network termination unit of an access line network shown in FIG. 1 in the form of a schematic block illustration contains a line interface LS as first interface (shown at the bottom in the figure) offered by an access line interface control referenced with framework unit RE, the line interface LS being provided for the access line network-side transmission and reception of a transmission frame containing a plurality n of data channels. The individual data channels of this transmission frame respectively have a data rate of 64 kbit/s. A control channel with a data rate of 16 kbit/s is contained in one of these data channels but, alternatively, also can be additionally contained in the transmission frame. This network termination unit also contains an interface So offered by a telecommunication interface control referenced as BA unit, the interface So being provided for the subscriber-side offering of telecommunication payload data channels for telecommunication applications TE1, TE2, TE8. The second interface So corresponds to a standardized ISDN interface of the type So with two B-channels of 64 kbit/s data rate each and one D channel having a data rate of 16 kbit/s. Over and above this, the network termination unit contains an interface IT offered by a data interface control referenced as Internet unit as third interface for the subscriber-side offering of data channels for data applications.

In the illustrated exemplary embodiment, the data interface control IE accesses the D-channel of the second interface So like a telecommunication application TE1. An interworking for the conversion of data to be transmitted at the subscriber side, and data to be transmitted at the access line network side, is provided between the telecommunication interface control BA or, respectively, the data interface control IE and the access line interface control RA. A bus system with time slot structure is preferably provided for this purpose. Before the transmission of payload data via the second interface So, signaling data allocated to the payload data are transmitted via the signaling channel D-channel of this interface So offered by the telecommunication interface control BA.

In a first development of this exemplary embodiment, signaling data allocated to the payload data are transmitted via the signaling channel D-channel of the second interface So offered by the telecommunication interface control BA before the transmission of the payload data via the third interface IT.

In a second development of this exemplary embodiment, the data interface control IE contains a control mechanism for enabling a data transmission via this data interface control IE after a signaling allocated to this data transmission has occurred via the signaling channel D-channel of the second interface So.

A third, preferred development of this exemplary embodiment includes both of the characteristics respectively described above for the first and second development of the exemplary embodiment. Features described below apply to all such developments.

The employment of the signaling channel D-channel of the second interface So for the transmission of signaling data for the transmission of payload data both via the second interface So and via the third interface IT is to be considered a special characteristic of the disclosed, subscriber-side network termination unit.

The telecommunication interface control BA unit converts the payload and signaling information of the transmission frame into the So format or, respectively, converts the payload and signaling information of the second interface So into the transmission frame. The telecommunication interface control BA only can access the first and second payload data time slot of the transmission frame. With respect to the second interface So, consequently, only functions of the physical layer, i.e. functions of the layer 1 according to the OSI reference model, are implemented in the subscriber-side network termination unit. The second interface So makes all features of an ISDN-BA available at the subscriber side.

For example, a local data network LAN having a plurality of data applications or an Internet terminal equipment can be connected to the third interface IT. However, some other terminal equipment with a constant data stream also can be connected. The third interface IT can, for example, be a standardized Ethernet interface. When a data application accessing the third interface IT becomes active, the data interface control IE sets up a connection via the D-channel of the second interface So per signaling. The following information transfer occurs between the data interface control IE and the access line interface control RE. Consequently, the signaling, in fact, occurs via the second interface So but not the data transmission. As a result thereof, the data transmission is not limited to twice 64 kbit/s but, dependent on the band width of the first interface LS and, consequently, on the band width of the third interface IT can, for example, amount to 12*64 kbit/s.

The data interface control IE of the broad band, third interface IT normally does not occupy the first and second payload data time slot of the transmission frame of the first interface LS. As a result thereof, a communication of telecommunication applications TE2, TE8 via the second interface So also is possible given operation of the third interface IT. When the remaining payload data time slots of the transmission frame of the first interface LS, however, do not offer enough band width for the needs of the data transmission provided via the third interface IT, the data interface control IE of the broad band, third interface IT also accesses the first and/or second payload data time slot of the transmission frame of the first interface LS not blocked by the existing telecommunication applications [sic] TE2, TE8 via the second interface So. Although the present invention has been described with reference to specific embodiments, those of skill in the art will recognize that changes may be made thereto without departing from the spirit and scope of the invention as set forth in the hereafter appended claims.

I claim:

1. A method for operating a subscriber-side network termination unit of an access line network, the method comprising the steps of:

providing the termination unit with a first interface offered by an access line interface control for access line network-side transmission and reception of a transmission frame containing a plurality of data channels including a signal channel;

providing the termination unit with a second interface offered by a telecommunication interface control for a subscriber-side offering of both telecommunication payload data channels for telecommunication applications and a signal channel allocated to the telecommunication payload data channels;

providing the termination unit with a third interface offered by a data interface control for the subscriber-side offering of data channels for data applications; and transmitting signaling data respectively allocated to payload data via the signaling channel of the second interface offered by the telecommunication interface control before the transmission of the payload data via the second interface or the third interface, and controlling the transmission of the signaling data, via the data interface control, before the transmission of the payload data via the third interface.

2. A method for operating a subscriber-side network termination unit of an access line network as claimed in claim 1, wherein data transmitted at the subscriber-side in the telecommunication payload data channels of the second interface are only transmitted in specific data channels in the access line network-side transmission frame.

3. A method for operating a subscriber-side network termination unit of an access line network as claimed in claim 2, wherein the data transmitted at the subscriber-side in the data channels of the third interface are transmitted in the access line network-side transmission frame in free data channels not provided for the transmission of the data transmitted at the subscriber-side in the telecommunication payload data channels of the second interface.

4. A method for operating a subscriber-side network termination unit of an access line network as claimed in claim 3, wherein the data transmitted at the subscriber-side in the data channels of the third interface is further transmitted in data channels provided for the transmission of the subscriber-side data transmitted in the telecommunication payload data channels of the second interface when enough data channels provided for the transmission of the subscriber-side data transmitted in the telecommunication payload data channels of the second interface are not free in the access line network-side transmission frame for the subscriber-side data.

5. A subscriber-side network termination unit of an access line network, comprising:

a first interface offered by an access line interface control for access line network-side transmission and reception of a transmission frame containing a plurality of data channels including a signaling channel;

a second interface offered by a telecommunication interface control for a subscriber-side offering of both telecommunication payload data channels for telecommunication applications and a signaling channel allocated to the telecommunication payload data channels;

a third interface offered by a data interface control for the subscriber-side offering of data channels for data applications; and a controller for enabling a data transmission via the data interface control after a signaling allocated to the data transmission has occurred via the signaling channel of the second interface, wherein the controller is integrated in the data interface control which, before the transmission of the payload data via the third interface, controls the transmission of the signaling data.

6. A subscriber-side network termination unit of an access line network as claimed in claim 5, wherein the second interface offers two telecommunication payload data channels for the telecommunication applications at the subscriber side.

7. A subscriber-side network termination unit of an access line network as claimed in claim 6, wherein the two telecommunication payload data channels offered by the second interface respectively have a data rate of 64 kbit/s, and the signaling channel offered by the second interface has a data rate of 16 kbit/s.

8. A subscriber-side network termination unit of an access line network as claimed in claim 5, wherein the first interface offers a transmission frame at the access line network side having a plurality of data channels, each of the plurality of data channels having a respective data rate of 64 kbit/s.

* * * * *